(12) United States Patent
Suzuki

(10) Patent No.: US 11,611,110 B2
(45) Date of Patent: Mar. 21, 2023

(54) ALL-SOLID-STATE BATTERY AND PRODUCTION METHOD THEREFOR

(71) Applicant: TOYOTA JIDOSHA KABUSHIKI KAISHA, Toyota (JP)

(72) Inventor: Yushi Suzuki, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/691,319

(22) Filed: Mar. 10, 2022

(65) Prior Publication Data

US 2022/0200057 A1 Jun. 23, 2022

Related U.S. Application Data

(62) Division of application No. 16/224,073, filed on Dec. 18, 2018, now Pat. No. 11,302,969.

(30) Foreign Application Priority Data

Dec. 20, 2017 (JP) ............................. JP2017-243874

(51) Int. Cl.
*H01M 10/0585* (2010.01)
*H01M 10/04* (2006.01)
(Continued)

(52) U.S. Cl.
CPC ..... *H01M 10/0585* (2013.01); *H01M 10/049* (2013.01); *H01M 50/116* (2021.01);
(Continued)

(58) Field of Classification Search
CPC ........... H01M 10/0585; H01M 50/183; H01M 50/543; H01M 10/049; H01M 2/0285; H01M 2/06; H01M 2/08; H01M 2/30
See application file for complete search history.

(56) References Cited

U.S. PATENT DOCUMENTS 5,098,801 A 3/1992 Boram et al.
5,372,897 A 12/1994 Kozawa et al.
(Continued)

FOREIGN PATENT DOCUMENTS

CN 1855602 A 11/2006
JP 2000106154 A 4/2000
(Continued)

*Primary Examiner* — Adam A Arciero
(74) *Attorney, Agent, or Firm* — Dinsmore & Shohl LLP

(57) ABSTRACT

A method for producing an all-solid-state battery, comprising the following steps (a) to (d), which are performed in the order of (a), (b), (c), and (d) or in the order of (a), (b), (d), and (c):
(a) introducing the all-solid-state battery laminate into the metal case,
(b) welding a protruding part of the positive electrode current collector layer or the negative electrode current collector layer and the folding margin part of the metal case,
(c) folding the folding margin part, and the protruding part of the positive electrode collector layer or the negative electrode current collector layer, which has been welded to the folding margin part toward the inside of the metal case together, and
(d) injecting a sealing resin into the metal case from the opening part of the metal case and then curing the sealing resin to seal the all-solid-state battery laminate in the metal case.

6 Claims, 7 Drawing Sheets

(51) Int. Cl.
H01M 50/116 (2021.01)
H01M 50/172 (2021.01)
H01M 50/183 (2021.01)
H01M 50/543 (2021.01)

(52) U.S. Cl.
CPC ....... H01M 50/172 (2021.01); H01M 50/183 (2021.01); H01M 50/543 (2021.01)

(56) References Cited

U.S. PATENT DOCUMENTS

| | | |
|---|---|---|
| 2006/0286447 A1 | 12/2006 | Kim |
| 2009/0181297 A1* | 7/2009 | Ashizaki ............. H01M 50/209 |
| | | 429/161 |
| 2018/0212210 A1 | 7/2018 | Suzuki |

FOREIGN PATENT DOCUMENTS

| | | |
|---|---|---|
| JP | 2002-050357 A | 2/2002 |
| JP | 2011-77501 A | 4/2011 |
| JP | 2018-116917 A | 7/2018 |

* cited by examiner (a)

(b)

(a)

(b)

ALL-SOLID-STATE BATTERY AND PRODUCTION METHOD THEREFOR

CROSS-REFERENCE TO RELATED APPLICATIONS

This application is a division of U.S. patent application Ser. No. 16/224,073, filed on Dec. 18, 2018, and entitled "All-Solid-State Battery and Production Method Therefore," which claims priority to Japanese Patent Application No. 2017-243874 filed Dec. 20, 2018, both of which are incorporated herein by reference in their entirety, including the specifications, drawings and abstracts.

FIELD

The present disclosure relates to an all-solid-state battery and a method for the production thereof. In particular, the present disclosure relates to an all-solid-state battery comprising a metal case and an all-solid-state battery laminate enclosed inside the metal case and a method for the production thereof.

Conventionally, liquid-type lithium ion batteries which are introduced into an outer can in which the positive electrode current collector of the battery and the outer can are spot welded have been known (for example, PTL 1).

Furthermore, particular attention has been paid to all-solid-state batteries in which the electrolytic solution is replaced with a solid electrolyte. For example, PTL 2 discloses an all-solid-state battery in which an all-solid-state battery element is formed by interposing a solid electrolyte between a positive electrode and a negative electrode is housed in an external body.

When producing an all-solid-state battery which is introduced into a metal case, in order to increase the reliability of the electrical connection between the current collector and the metal case, it is necessary to weld the current collector and the metal case, as described in PTL 1.

CITATION LIST

Patent Literature

[PTL 1] Japanese Unexamined Patent Publication (Kokai) No. 2002-050357
[PTL 2] Japanese Unexamined patent Publication (Kokai) No. 2000-106154

SUMMARY

Technical Problem

In order to weld the current collector layer and the metal case, it is necessary to provide a clearance in the metal case into which a welding device can be inserted in order to perform the welding process. Thus, there is a problem in that the energy density of the battery is reduced.

Thus, the present disclosure has been achieved in view of the above circumstances and aims to provide a method for producing an all-solid-state battery in which it is not necessary to provide a clearance in the metal case for the insertion of a welding device, whereby the energy density of the battery can be improved. Furthermore, the present disclosure aims to provide an all-solid-state battery which can be obtained by such a method.

Solution to Problem

The inventor of the present disclosure have discovered that the above-described problem can be solved by the following means.

Aspect 1

A method for producing an all-solid-state battery, the all-solid-state battery comprising a metal case and an all-solid-state battery laminate enclosed in the metal case,
  wherein the metal case has an opening part and a folding margin part on at least one end thereof,
  wherein the all-solid-state battery laminate includes one or more all-solid-state unit cells, each of the all-solid-state unit cells being obtained by laminating a positive electrode current collector layer, a positive electrode active material layer, a solid electrolyte layer, a negative electrode active material layer, and a negative electrode current collector layer in this order,
  wherein the method comprises the following steps (a) to (d), which are performed in the order of (a), (b), (c), and (d), or in the order of (a), (b), (d), and (c):
    (a) introducing the all-solid-state battery laminate into the metal case,
    (b) welding a protruding part of the positive electrode current collector layer or the negative electrode current collector layer, and the folding margin part of the metal case,
    (c) folding the folding margin part, and the protruding part of the positive electrode collector layer or the negative electrode current collector layer, which has been welded to the folding margin part toward the inside of the metal case together, and
    (d) injecting a sealing resin into the metal case from the opening part of the metal case, and then curing the sealing resin to seal the all-solid-state battery laminate in the metal case, and
  wherein among the positive electrode current collector layer and the negative electrode current collector layer, a current collector layer of which the protruding part has not been welded to the metal case is electrically insulated from the metal case.

Aspect 2

The method according to aspect 1, wherein the steps (a) to (d) are performed in the order of (a), (b), (c), and (d).

Aspect 3

The method according to aspect 1 or 2, wherein in the step (c), the folding margin part and the protruding part of the positive electrode current collector layer or the negative electrode current collector layer, which has been welded to the folding margin part, are folded toward the inside of the metal case so that the angle between the folding margin part and an inner wall of the metal case is an acute angle.

Aspect 4

The method according to any one of aspects 1 to 3, wherein the welding is performed by ultrasonic welding.

Aspect 5

The method according to any one of aspects 1 to 4, wherein among the positive electrode current collector layer and the negative electrode current collector layer, the protruding part of the current collector layer of which the protruding part has not been welded to the metal case protrudes from the metal case.

Aspect 6

The method according to any one of aspects 1 to 5, wherein the all-solid-state battery laminate is a bipolar-type or a monopolar-type.

Aspect 7

The method according to any one of aspects 1 to 6, wherein the sealing resin is a thermosetting resin or a thermoplastic resin.

Aspect 8

An all-solid-state battery, comprising:
an all-solid-state battery laminate,
a metal case which houses the all-solid-state battery laminate, and
a sealing resin which seals the all-solid-state battery laminate inside the metal case,
wherein the metal case has an opening part and a folding margin part on at least one end thereof,
wherein the all-solid-state battery laminate includes one or more all-solid-state unit cells, each of the all-solid-state unit cells being obtained by laminating a positive electrode current collector layer, a positive electrode active material layer, a solid electrolyte layer, a negative electrode active material layer, and a negative electrode current collector layer in this order,
wherein a protruding part of the positive electrode current collector layer or the negative electrode current collector layer is welded to the folding margin part of the metal case,
wherein the folding margin part, and the protruding part of the positive electrode collector layer or the negative electrode current collector layer, which has been welded to the folding margin part, are folded toward the inside of the metal case together, and
wherein among the positive electrode current collector layer and the negative electrode current collector layer, a current collector layer of which the protruding part has not been welded to the metal case is electrically insulated from the metal case.

Aspect 9

The all-solid-state battery according to aspect 8, wherein among the positive electrode current collector layer and the negative electrode current collector layer, the protruding part of the current collector layer of which the protruding part has not been welded to the metal case is protrudes from the metal case.

Aspect 10

The all-solid-state battery according to aspect 8 or 9, wherein the all-solid-state battery laminate is a bipolar-type or a monopolar-type.

ADVANTAGEOUS EFFECT

According to the method for producing an all-solid-state battery of the present disclosure, it is not necessary to provide a clearance in the metal case for the insertion of a welding device in order to perform a welding process, whereby an all-solid-state battery having an improved energy density of the battery can be produced. Furthermore, according to the all-solid-state battery of the present disclosure, it is not necessary to provide a clearance in the metal case for the insertion of a welding device during production, whereby the energy density of the battery can be improved.

DESCRIPTION OF EMBODIMENTS

Figure 1:
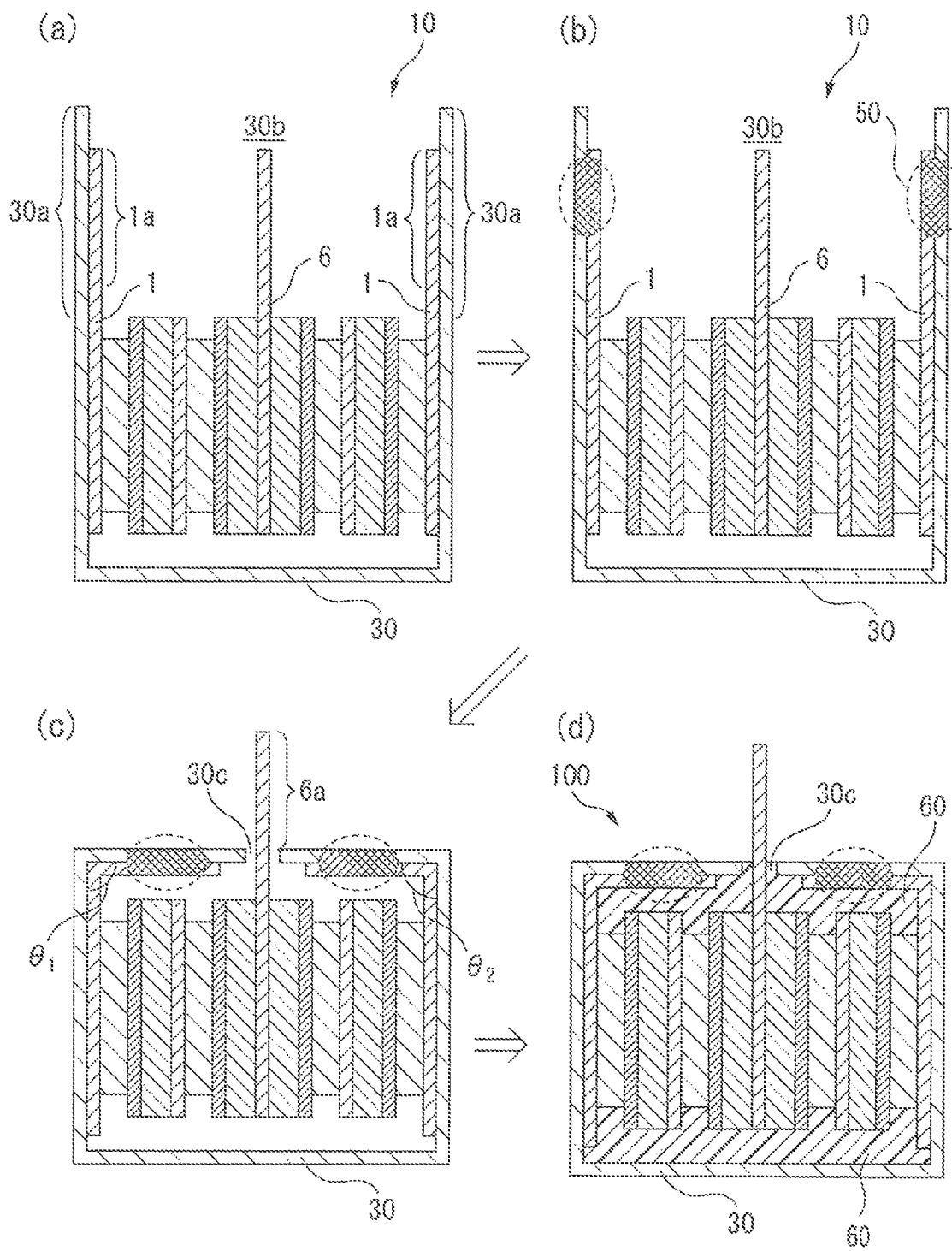
FIG. 1 is a schematic cross-sectional view showing a process for producing an all-solid-state battery according to the method of the present disclosure.

The embodiments of the present disclosure will be described in detail below. Note that the present disclosure is not limited to the following embodiments and various modifications can be made within the scope of the gist of the present disclosure. Furthermore, in the explanation of the drawings, the same components are given the same reference numerals and duplicate explanations are omitted.

<<Method for the Producing an All-Solid-State Battery>>

The production method of the present disclosure is a method for producing an all-solid-state battery, the all-solid-state battery comprising a metal case and an all-solid-state battery laminate enclosed in the metal case, wherein the metal case has an opening part and a folding margin part on at least one end thereof, and the all-solid-state battery laminate includes one or more all-solid-state unit cells obtained by laminating a positive electrode current collector layer, a positive electrode active material layer, a solid electrolyte layer, a negative electrode active material layer, and a negative electrode current collector layer in this order.

The production method of the present disclosure includes the following steps (a) to (d), which are performed in the order of (a), (b), (c), and (d), or in the order of (a), (b), (d), and (c):

(a) introducing the all-solid-state battery laminate into the metal case,
(b) welding a protruding part of the positive electrode current collector layer or the negative electrode current collector layer, and the folding margin part of the metal case,
(c) folding the folding margin part, and the protruding part of the positive electrode collector layer or the negative electrode current collector layer, which has been welded to the folding margin part toward the inside of the metal case together, and (d) injecting a sealing resin into the metal case from the opening part of the metal case, and then curing the sealing resin to seal the all-solid-state battery laminate in the metal case, and wherein among the positive electrode current collector layer and the negative electrode current collector layer, a current collector layer of which the protruding part has not been welded to the metal case is electrically insulated from the metal case.

In some embodiments, from the viewpoint of easily extracting electrical power from the current collector layer via the protruding part, that among the positive electrode current collector layer and the negative electrode current collector layer, the protruding part of the current collector layer of which the protruding part has not been welded to the metal case protrudes from the metal case.

Each of the steps of the production method of the present disclosure will be described below with reference to the drawings. FIG. 1 is a schematic view showing each of the steps for producing an all-solid-state battery 100. The all-solid-state battery 100 includes a metal case 30 and an all-solid-state battery laminate 10 enclosed within the metal case 30.

Step (a)

In step (a), the all-solid-state battery laminate is introduced into the metal case. The method for introducing the all-solid-state battery laminate into the metal case is not particularly limited and any conventional method can be used. For example, when the metal case having an opening part on at least one end thereof is formed in advance, the all-solid-state battery laminated can be inserted into the metal case through the opening part of the metal case. Furthermore, when the metal case is an assembly of two or more parts, the all-solid-state battery laminate can be inserted the opening part of the metal case, which has been assembled from the parts of the metal case, or the all-solid-state battery laminate can be introduced by assembling the parts of the metal case after arranging the all-solid-state battery laminate so as to be interposed between the parts of the metal case.

FIG. 1(a) is a cross-sectional view showing an example of an aspect in which the all-solid-state battery laminate 10 has been introduced through the opening part 30b of the metal case 30. In this aspect, the all-solid-state battery laminate 10 is introduced into the metal case 30 such that the protruding parts 1a of the two positive electrode current collector layers 1, which are arranged outermost in the lamination direction of the all-solid-state battery laminate 10, and the two folding margin parts 30a of the metal case 30 are adjacent to each other.

Step (b)

In step (b), the protruding part of the positive electrode current collector layer or the negative electrode current collector layer and the folding margin part of the metal case are welded. The welding is not particularly limited and can be performed by any known means. For example, the welding can be performed by ultrasonic welding. Furthermore, the welding range is not particularly limited so long as the positive electrode current collector layer or negative electrode current collector layer is electrically connected with the metal case via the protruding parts.

FIG. 1(b) is a cross-sectional view showing an example of an aspect in which the protruding parts 1a of the positive electrode current collector layers 1 of the all-solid-state battery laminate 10, which was introduced into the metal case 30 in step (a), and the folding margin parts 30a of the metal case 30 are welded at the weld treatment site 50.

Step (c)

In step (c), the folding margin part, and the protruding part of the positive electrode collector layer or the negative electrode current collector layer, which has been welded to the folding margin part, are folded together toward the inside of the metal case. In the all-solid-state battery obtained by the method of the present disclosure, among the positive electrode current collector layer and the negative electrode current collector layer, the current collector layer of which the protruding parts has not been welded to the metal case is electrically insulated from the metal case. Thus, at the time of folding, it is necessary that, among the positive electrode current collector layer and the negative electrode current collector layer, the current collector layer of which the protruding part has not been welded to the metal case should not be electrically connected with the metal case.

FIG. 1(c) is a cross-sectional view showing an example of an aspect in which the folding margin parts 30a of the metal case 30 and the protruding parts 1a of the positive electrode current collector layers 1, which have been welded with the folding margin parts 30a, are folded together toward the inside of the metal case 30.

In step (c), the folding margin parts and the protruding parts of the positive electrode current collector layers or the negative electrode current collector layers, which have been welded with the folding margin parts, can be folded toward the inside of the metal case so that the angle between the folding margin parts and the inner wall of the metal case becomes an acute angle, a right angle, or an obtuse angle. In some embodiments, from the viewpoint of preventing the penetration of moisture from the outside, this angle be folded to an acute angle or a right angle, in particular an acute angle. Further, if this angle is an acute angle, when step (d) is performed thereafter, the gap between the metal case and the all-solid-state battery laminate can be completely sealed with resin and it is easy to determine whether or not such sealing is complete. Note that if there are two or more locations to be folded, the angles of folding thereof can be independently selected.

Figure 3:
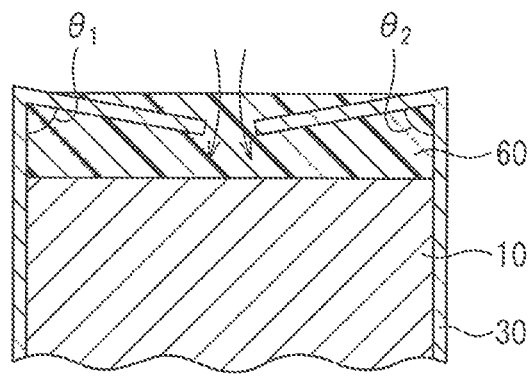
FIG. 3 is a schematic view showing the angle between the folding margin part of the metal case and the inner wall of the metal case.
Figure 3:
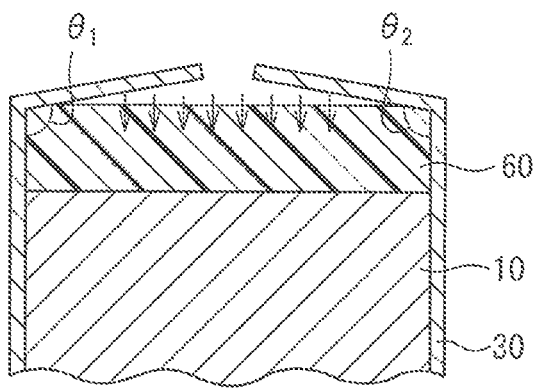

In connection thereto, in the aspect shown in FIG. 1(c), the angles $\theta_1$ and $\theta_2$ between the folding margin parts and the inner wall of the metal case are right angles. In the aspect shown in FIG. 3(a), the angles $\theta_1$ and $\theta_2$ are acute angles. In the aspect shown in FIG. 3(b), the angles $\theta_1$ and $\theta_2$ are obtuse angles. Note that in FIGS. 3(a) and (b), in order to clarify the angles $\theta_1$ and $\theta_2$, the protruding part of the current collector layer of the all-solid-state battery laminate and the welded portions have been omitted.

Furthermore, when folding in step (c), for example, the two folding margin parts of the metal case and the protruding parts of the positive electrode current collector layers or the negative electrode current collector layers, which have been welded with the folding margin parts, the folding of step (c) may be performed only one time or may be performed two or more times.

Figure 4:
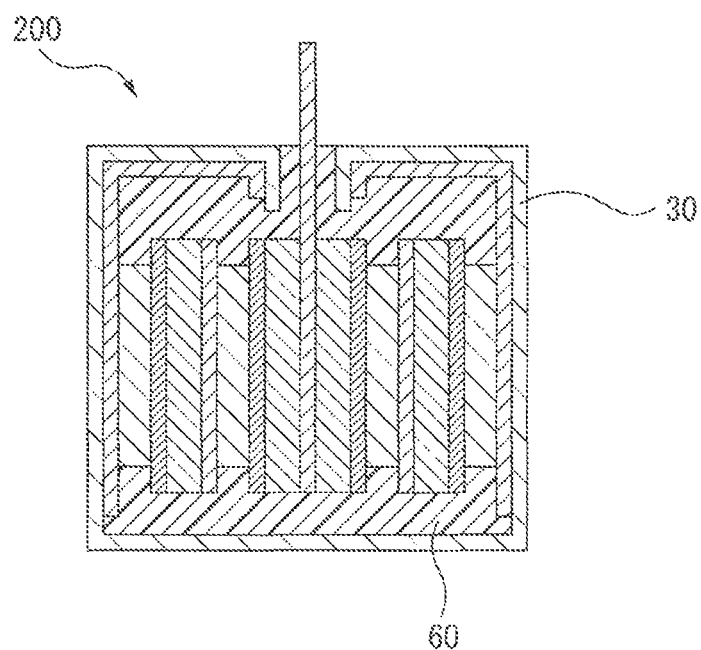
FIG. 4 is a schematic cross-sectional view of one aspect of an all-solid-state battery obtained by the production method of the present disclosure.

For example, FIG. 4 is a cross-sectional view showing an aspect of the all-solid-state battery 200 produced by performing folding two times.

Step (d)

In step (d), a sealing resin is injected into the metal case from the opening part of the metal case, and then is cured to seal the all-solid-state battery laminate in the metal case. The sealing resin is not particularly limited. For example, the sealing resin may be a thermosetting resin or a thermoplastic resin. More specifically, for example, an epoxy resin, an acrylic resin, or the like can be used as the sealing resin, though the sealing resin is not limited thereto. Furthermore, the method for curing the sealing resin is not particularly limited and any known method can be used in accordance with the type of the sealing resin.

FIG. 1(d) is a cross-sectional view showing an example of an aspect in which the sealing resin 60 has been injected into the metal case 30 from the remaining opening part 30c of the metal case 30 after folding, and then the sealing resin 60 is cured to seal the all-solid-state battery laminate 10 in the metal case 30.

Order of Steps (a) to (d)

The following steps (a) to (d) can be performed in the order of (a), (b), (c), and (d), i.e., as shown in FIG. 1.

Performing each of the steps in this order, i.e., performing step (d) after performing step (c), means that it is unlikely that a gap will form between the folded portions and the sealing resin, as it is unlikely that moisture can penetrate therein.

Figure 2:
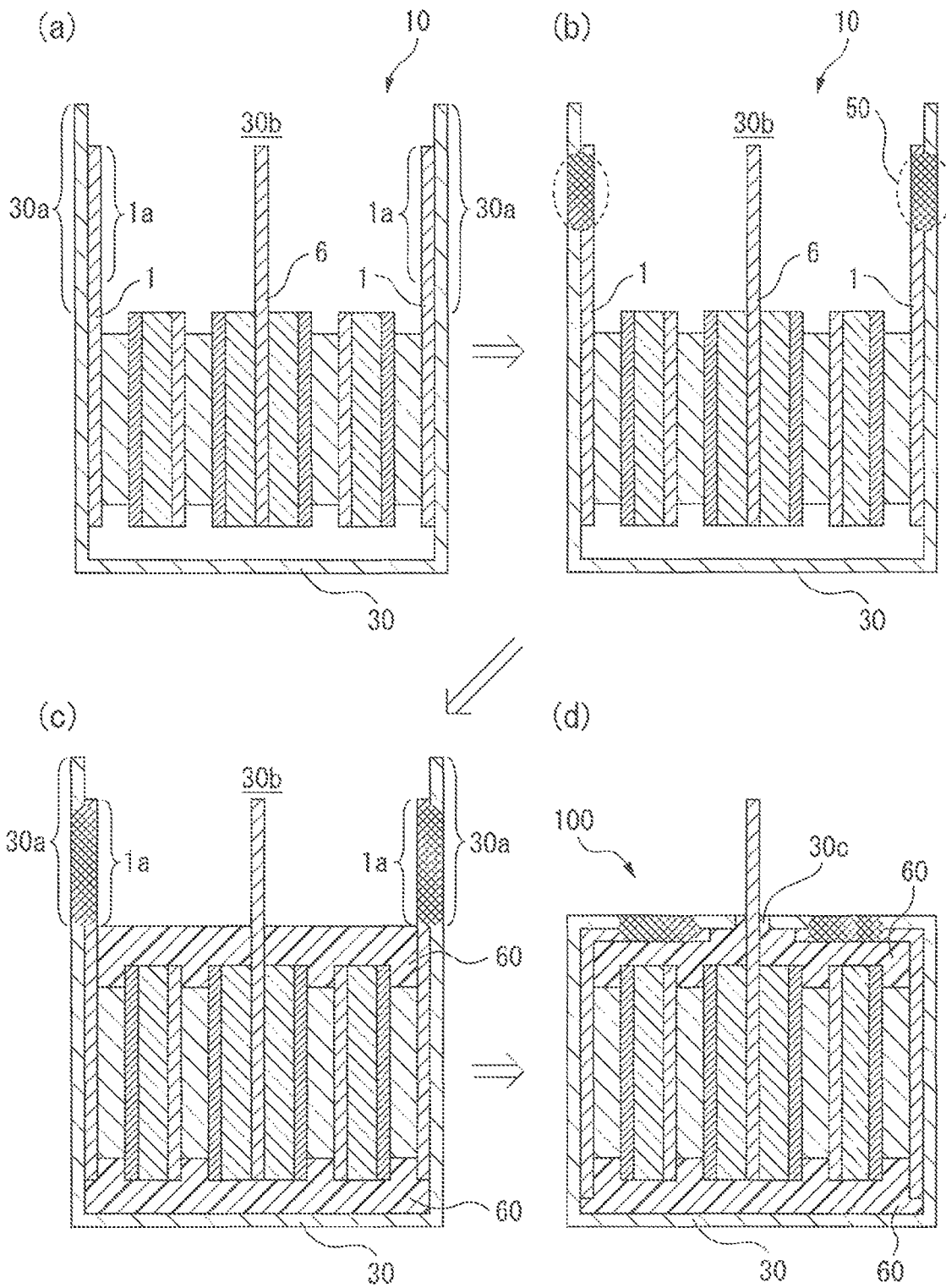
FIG. 2 is a schematic cross-sectional view showing the process for producing an all-solid-state battery according to the method of the present disclosure.

Furthermore, the following steps (a) to (d) can be performed in the order of (a), (b), (d), and (c), i.e., as shown in FIG. 2.

Specifically, as shown in, for example, FIG. 2(c), step (d) can be performed by injecting the sealing resin 60 from the opening part 30b of the metal case 30 and then curing the sealing resin 60. Next, as shown in FIG. 2(d), by folding the folding margins 30a of the metal case 30 together with the protruding parts 1a of the positive electrode current collector layer 1, which have been welded with the folding margin parts 30 toward the inside of the metal case 30 (i.e., by performing step (c)), the all-solid-state battery 100 of the present embodiment can be produced.

Form of the All-Solid-State Battery

The form of the all-solid-state battery produced by the method of the present disclosure is not particularly limited, and can be of a coin type, laminate type, cylindrical type, square type, or the like.

All-Solid-State Battery Laminate

In the present disclosure, the all-solid-state battery can include one or more all-solid-state unit cells. Furthermore, the all-solid-state unit cell is formed by laminating the positive electrode current collector layer, positive electrode active material layer, solid electrolyte layer, negative electrode active material layer, and negative electrode current collector layer in this order.

As the type of the all-solid-state battery laminate, an all-solid-state lithium battery laminate, an all-solid-state sodium battery laminate, an all-solid-state magnesium battery laminate, an all-solid-state calcium battery laminate, or the like can be used. In some embodiments, the type of all-solid state battery laminate is an all-solid-state lithium battery laminate or all-solid-state sodium battery laminate.

In some embodiments, the all-solid-state battery laminate may be a primary battery laminate or a secondary battery laminate.

Figure 5:
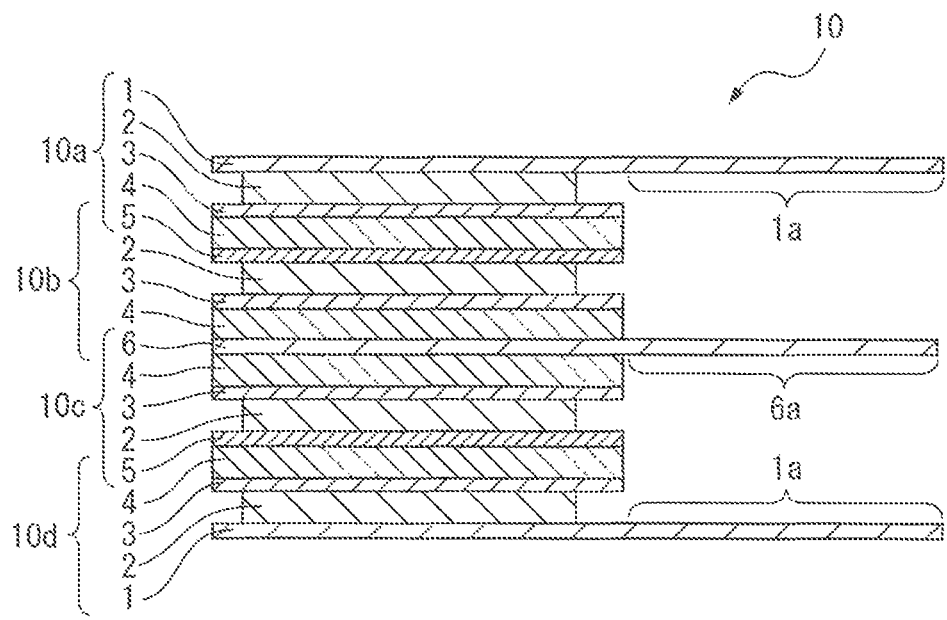
FIG. 5 is a schematic cross-sectional view showing an aspect of the all-solid-state battery laminate which can be used in the production method and the all-solid-state battery of the present disclosure.
Figure 5:
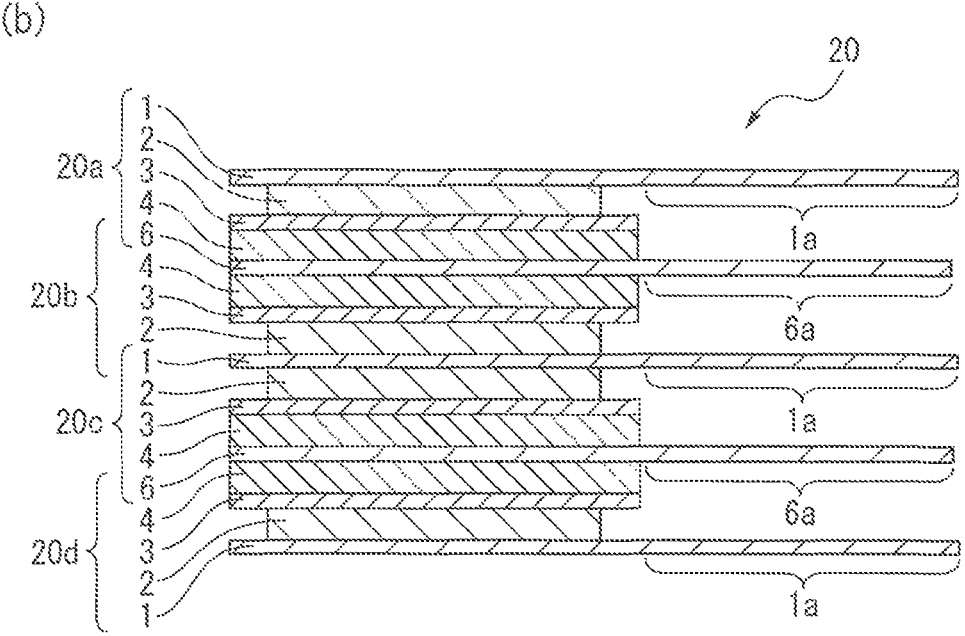

When the all-solid-state battery laminate according to the present disclosure includes two or more all-solid-state unit cells, the all-solid-state battery laminate may be a bipolar type or may be a monopolar type. All-solid-state battery laminates of a bipolar type and a monopolar type will be specifically described with reference to FIG. 5.

FIG. 5(a) is a cross-sectional view showing an example of a bipolar-type all-solid-state battery laminate. The bipolar-type all-solid-state battery laminate 10 includes four all-solid-state unit cells 10a, 10b, 10c, and 10d.

The all-solid-state unit cell 10a is obtained by laminating a positive electrode current collector layer 1, positive electrode active material layer 2, solid electrolyte layer 3, negative electrode active material layer 4, and positive electrode/negative electrode current collector layer 5 in this order. The all-solid-state unit cell 10b is obtained by laminating a positive electrode/negative electrode current collector layer 5, positive electrode active material layer 2, solid electrolyte layer 3, negative electrode active material layer 4, and negative electrode current collector layer 6 in this order. The all-solid-state unit cell 10c is obtained by laminating a negative electrode current collector layer 6, negative electrode active material layer 4, solid electrolyte layer 3, positive electrode active material layer 2, and positive electrode/negative electrode current collector layer 5 in this order. The all-solid-state unit cell 10d is obtained by laminating a positive electrode/negative electrode current collector layer 5, negative electrode active material layer 4, solid electrolyte layer 3, positive electrode active material layer 2, and positive electrode current collector layer 1 in this order.

In the bipolar-type all-solid-state battery laminate 10, the all-solid-state unit cell 10a and all-solid-state unit cell 10b as well as the all-solid-state unit cell 10c and all-solid-state unit cell 10d can share a positive electrode/negative electrode current collector layer 5. Furthermore, the all-solid-state unit cell 10b and all-solid-state unit cell 10c can share a negative electrode current collector layer 6. The positive electrode/negative electrode current collector layer 5 is a current collector layer that can be shared by the positive electrode active material layer and the negative electrode active material layer. Note that the positive electrode/negative electrode current collector may not be shared between each all-solid-state unit cell. In this case, the positive electrode current collector layer and negative electrode current collector layer may be provided depending on the adjacent active material layers so as to be electrically connected (not shown).

FIG. 5(b) is a cross-sectional view of an example of a monopolar-type all-solid-state battery laminate. The monopolar-type all-solid-state battery laminate 20 includes four all-solid-state unit cells 20a, 20b, 20c, and 20d.

The all-solid-state unit cell 20a is obtained by laminating a positive electrode current collector layer 1, positive electrode active material layer 2, solid electrolyte layer 3, negative electrode active material layer 4 and negative electrode current collector layer 6 in this order. The all-solid-state unit cell 20b is obtained by laminating a negative electrode current collector layer 6, negative electrode active material layer 4, solid electrolyte layer 3, positive electrode active material layer 2, and positive electrode current collector layer 1 in this order. Furthermore, since the lamination order of the all-solid-state unit cell 20c is the same as the lamination order of the unit all-solid-state battery 20a and the lamination order of the all-solid-state unit cell 20d is the same as the lamination order of the all-solid-state unit cell 20b, descriptions thereof have been omitted.

In bipolar-type and monopolar-type all-solid-state battery laminates, the current collector layers, which are arranged in the outermost layers in the lamination direction, may have the same electrode or may have different electrodes.

For example, in the bipolar-type all-solid-state battery laminate 10 of FIG. 5(a), the two current collector layers arranged outermost in the lamination direction (the uppermost and bottommost layers when viewing FIG. 5(a) from the front) are both positive electrode current collector layers 1. In this case, it is necessary that protruding parts la, which are welded with the folding margin parts of the metal case as described later, be provided for the respective positive electrode current collector layers 1. Furthermore, from the viewpoint of facilitating the extraction of electrical power, a protruding part 6a may be provided in the negative electrode current collector layer 6. Note that, from the viewpoint of preventing short-circuiting, it is necessary that the negative electrode layer 6 be electrically insulated from the metal case, as described later.

Furthermore, in the all-solid-state battery layer, when the current collector layers arranged outermost in the lamination direction are electrodes of different polarities, it may be possible to weld the protruding part of only one current collector layer and the folding margin part of the metal case and to electrically insulate the current collector layer of the other side from the metal case (not shown).

Like the all-solid-state battery laminate 10 described above, in the all-solid-state battery laminate 20 (FIG. 5(b)), the two current collector layers arranged outermost in the lamination direction are both positive electrode current collector layers 1. In these two positive electrode current collector layers 1, it is necessary to provide protruding parts 1a, which are described later, for welding with the folding margin parts of the metal case. Note that since the all-solid-state battery laminate 20 is of a monopolar type, from the viewpoint of more easily extracting electrical power, protruding parts can be provided in all of the included current collector layers and the protruding parts of the current collector layers of the same electrode can be appropriately bundled and electrically connected. However, in this case, since the protruding parts 1a of the positive electrode current collector layers 1 are welded with the folding margin parts of the metal case, as described later, from the viewpoint of preventing short circuits, it is necessary to electrically insulate the negative electrode current collector layers 6 from the metal case.

Examples of each of the layers constituting the all-solid-state battery laminate will be described below.

(Current Collector Layer)

In the present disclosure, the current collector layer is laminated on the surface of the active material layer opposite to the surface of the active material layer onto which the solid electrolyte layer is laminated. When the active material layer is the positive electrode active material layer, the current collector layer laminated thereon is the positive electrode current collector layer. When the active material layer is the negative electrode active material layer, the current collector layer laminated thereon is the negative electrode current collector layer. Furthermore, when the all-solid-state battery laminate is of a bipolar type, a positive electrode/negative electrode current collector layer can be used. The expression "positive electrode/negative electrode current collector layer" means a current collector layer that can function as either electrode (positive electrode or negative electrode). In other words, in the case of a bipolar-type all-solid-state battery laminate, "positive electrode/negative electrode current collector layer" means a current collector layer that is both a positive electrode active material layer and a negative electrode active material layer.

The material constituting the positive electrode current collector layer, negative electrode current collector layer, or positive electrode/negative electrode current collector layer is not particularly limited and may be any of various metals such as silver, copper, gold, aluminum, nickel, iron, stainless steel (SUS), titanium or alloys thereof. In some embodiments, from the viewpoint of chemical stability, an aluminum current collector layer is used as the positive electrode current collector layer, a copper current collector layer is used as the negative electrode current collector layer, and SUS is used as the positive electrode/negative electrode current collector layer.

Furthermore, the length (size) of the protruding part 1a of the positive electrode current collector layer 1 is not particularly limited and may be set in accordance with the purpose or application of the desired all-solid-state battery. A length within the range in which the protruding part 1a can be welded with the folding margin part 30a of the metal case 30 is sufficient.

Furthermore, the form of each of the current collector layers is not particularly limited, and may be, for example, foil-like, plate-like, or mesh-like.

(Positive Electrode Active Material Layer)

The positive electrode active material layer includes at least a positive electrode active material and may further include a solid electrolyte, as described later. In addition thereto, depending on the purpose or application, for example, an additive conventionally used in the positive electrode active material layer of all-solid-state batteries, such as a conductive aid or binder, can be included.

In the present disclosure, the material used in the positive electrode active material layer is not particularly limited and any known material can be used. For example, lithium cobalt oxide ($LiCoO_2$), lithium nickel oxide ($LiNiO_2$), lithium manganate ($LiMn_2O_4$), $LiNi_{1/3}Mn_{1/3}Co_{1/3}O_2$ or a heterogeneous element substituent having a Li—Mn spinel structure represented by $Li_{1+x}Mn_{2-x-y}M_yO_4$ (wherein M is at least one metal element selected from Al, Mg, Co, Fe, Ni and Zn) can be used. However, the material of the positive electrode active material layer is not limited thereto.

The conductive aid is not particularly limited and any known conductive aid can be used. For example, a carbon material such as VGCF (vapor grown carbon fiber) or carbon nanofibers or a metal material can be used. However, the conductive aid is not limited thereto.

The binder is not particularly limited and any known binder can be used. For example, materials such as polyvinylidene fluoride (PVdF), carboxymethyl cellulose (CMC), butadiene rubber (BR), styrene butadiene rubber (SBR) or combinations thereof can be used. However, the binder is not limited thereto.

(Solid Electrolyte Layer)

The solid electrolyte layer includes at least a solid electrolyte. The solid electrolyte is not particularly limited and any material commonly used as the solid electrolyte of all-solid-state batteries can be used. For example, a known sulfide solid electrolyte or a known oxide solid electrolyte can be used. The solid electrolyte may be a glass or a crystallized glass (glass ceramic).

As examples of the sulfide solid electrolyte, sulfide-based amorphous solid electrolytes such as, for example, $Li_2S$—$SiS_2$, $LiI$—$Li_2S$—$SiS_2$, $LiI$—$Li_2S$—$mP_2S_5$, $LiI$—$LiBr$—$Li_2S$—$P_2S_5$, $Li_2S$—$P_2S_5$—$LiI$—$LiBr$, $Li_2S$—$P_2S_5$—$GeS_2$, LiI—Li$_2$S—P$_2$O$_5$, LiI—Li$_3$PO$_4$—P$_2$S$_5$, and Li$_2$S—P$_2$S$_5$; sulfide-type crystalline solid electrolytes such as, for example, Li$_{10}$GeP$_2$S$_{12}$, Li$_7$P$_3$S$_{11}$, Li$_3$PS$_4$, and Li$_{3.25}$P$_{0.75}$S$_4$; and combinations thereof can be used. However, the sulfide solid electrolyte is not limited thereto.

As examples of the oxide solid electrolyte, polyethylene oxide (PEO), polypropylene oxide (PPO), and copolymers thereof can be used. However, the oxide solid electrolyte is not limited thereto.

In addition to the above-described solid electrolyte, the solid electrolyte layer may include a binder as necessary. Specific examples thereof are the same as the "binders" described above for the "positive electrode active material layer", and thus, a description thereof has been omitted.

(Negative Electrode Active Material Layer)

The negative electrode active material layer includes at least a negative electrode active material and may further include a solid electrolyte as described above. In addition thereto, depending on the purpose or application thereof, for example, additives commonly used in the negative electrode active material layer of all-solid-state batteries, such as a conductive aide or binder, can be included.

In the present disclosure, the material of the negative electrode active material is not particularly limited as long as the material is capable of occluding and releasing metal ions such as lithium ions. For example, metal elements such as Li, Sn, Si, or In, an alloy of lithium and titanium, or a carbon material such as hard carbon, soft carbon, or graphite may be used. However, the material of the negative electrode active material layer is not limited thereto.

Regarding the additives used in the negative electrode active material layer, such as the solid electrolyte, conductive aid, and binder, those described above regarding the positive electrode active material layer and the solid electrolyte layer can be appropriately used.

Metal Case

In the present disclosure, the material of the metal case is not particularly limited as long as a metal is used. Any metallic material which is conventionally used as the outer can of all-solid-state batteries may be used. For example, aluminum, aluminum alloys, stainless steel or other suitable materials having appropriate rigidity can be used.

It is sufficient that the metal case has at least one opening part whereby the all-solid-state battery laminate can be introduced therein. The shape of the metal case is not particularly limited and can be determined appropriately in accordance with the purpose or intended application of the desired all-solid-state battery, or the shape and structure of the all-solid-state battery laminate.

Figure 6:
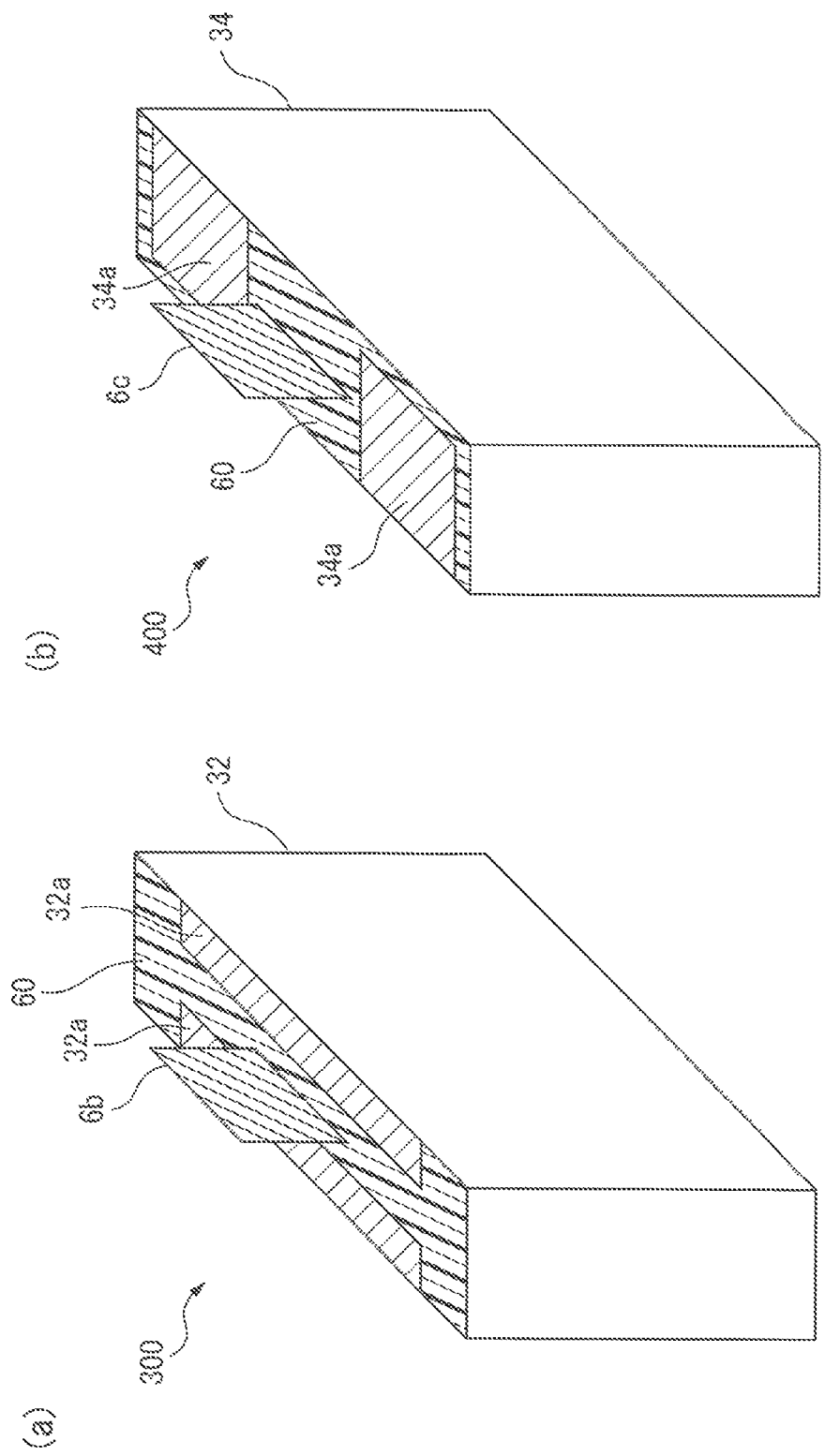
FIG. 6 is a perspective view schematically showing an example of the exterior of the all-solid-state battery of the present disclosure.

Specifically, when the all-solid-state battery laminate is of a bipolar type, as shown in in FIG. 5(a), a metal case 32 as shown in FIG. 6(a) can be used. Furthermore, when the all-solid-state battery laminate is of a monopolar type, as shown in FIG. 5(b), a metal case 34 as shown in FIG. 6(b) can be used. Note that for the sake of convenience of explanation, details regarding the layer configuration of the all-solid-state battery laminate, the sealing resin, etc., of FIGS. 6(a) and 6(b) have been omitted.

In FIG. 6(a), a case in which the two outermost layers of the bipolar-type all-solid-state battery laminate in the lamination direction are positive electrode current collector layers of the all-solid-state battery 300 will be described. In other words, the protruding parts of the two outermost positive electrode current collector layers are welded with the folding margin parts 32a of the metal case 32 and are folded toward the inside of the inside of the metal case 32 along with the folding margin parts 32a. As a result, the negative electrode current collector layers are electrically insulated from the metal case 32 and the protruding part 6b of the negative electrode current collector layer protrudes from the metal case 32.

Note that when the two outermost layers of the all-solid-state battery laminate in the lamination direction are negative electrode current collector layers, the protruding part which protrudes from the metal case 32 should be the protruding part of the positive electrode current collector layer.

In the aspect shown in FIG. 5(b), since the all-solid-state battery laminate of the all-solid-state battery 400 is monopolar, the protruding part of the current collector layer of the negative electrode, which is a bundle of the protruding parts 6c, protrudes from a central portion of the opening part of the metal case 34. The protruding parts of the current collector layers of the positive electrode can be divided into halves and bundled in accordance with the positions of the folding margin parts 34a of the metal case 34 and welded to the respective folding margin part 34a.

Note that, contrary to the above, the protruding parts of the positive electrode current collector layers protrude from the opening part of the metal case and the protruding parts of the negative electrode current collector layer are divided in accordance with the position of the folding margin part of the metal case, are bundled, and can be welded to each of the folding margin parts.

<<All-Solid-State Battery>>

The all-solid-state battery of the present disclosure includes the all-solid-state battery laminate, the metal case in which the all-solid-state battery laminate is housed, and a sealing resin for sealing the all-solid-state battery laminate inside the metal case. The metal case has, on at least one end thereof, an opening and a folding margin part. The all-solid-state battery laminate includes one or more all-solid-state unit cells, each of the all-solid-state unit cells being obtained by laminating a positive electrode current collector layer, a positive electrode active material layer, a solid electrolyte layer, a negative electrode active material layer, and a negative electrode current collector in this order. The protruding part of the positive electrode current collector layer or negative electrode current collector layer is welded to the folding margin part of the metal case. The folding margin part, and the protruding part of the positive electrode current collector layer or negative electrode current collector layer welded thereto are folded toward the inside of the metal case together. Among the positive electrode current collector layer and the negative electrode current collector layer, of which the current collector layer the protruding part is not welded to the metal case is electrically insulated from the metal case.

Regarding the all-solid-state battery laminate and metal case of the all-solid-state battery according to the present disclosure, refer to the description regarding the method for the production of the all-solid-state battery. The all-solid-state battery according to the present disclosure can be produced by the method for producing the all-solid-state battery of the present disclosure.

EXAMPLES

The Examples of the present disclosure are shown below. Note that the following Examples are merely explanatory and do not limit the present disclosure.

Figure 7:
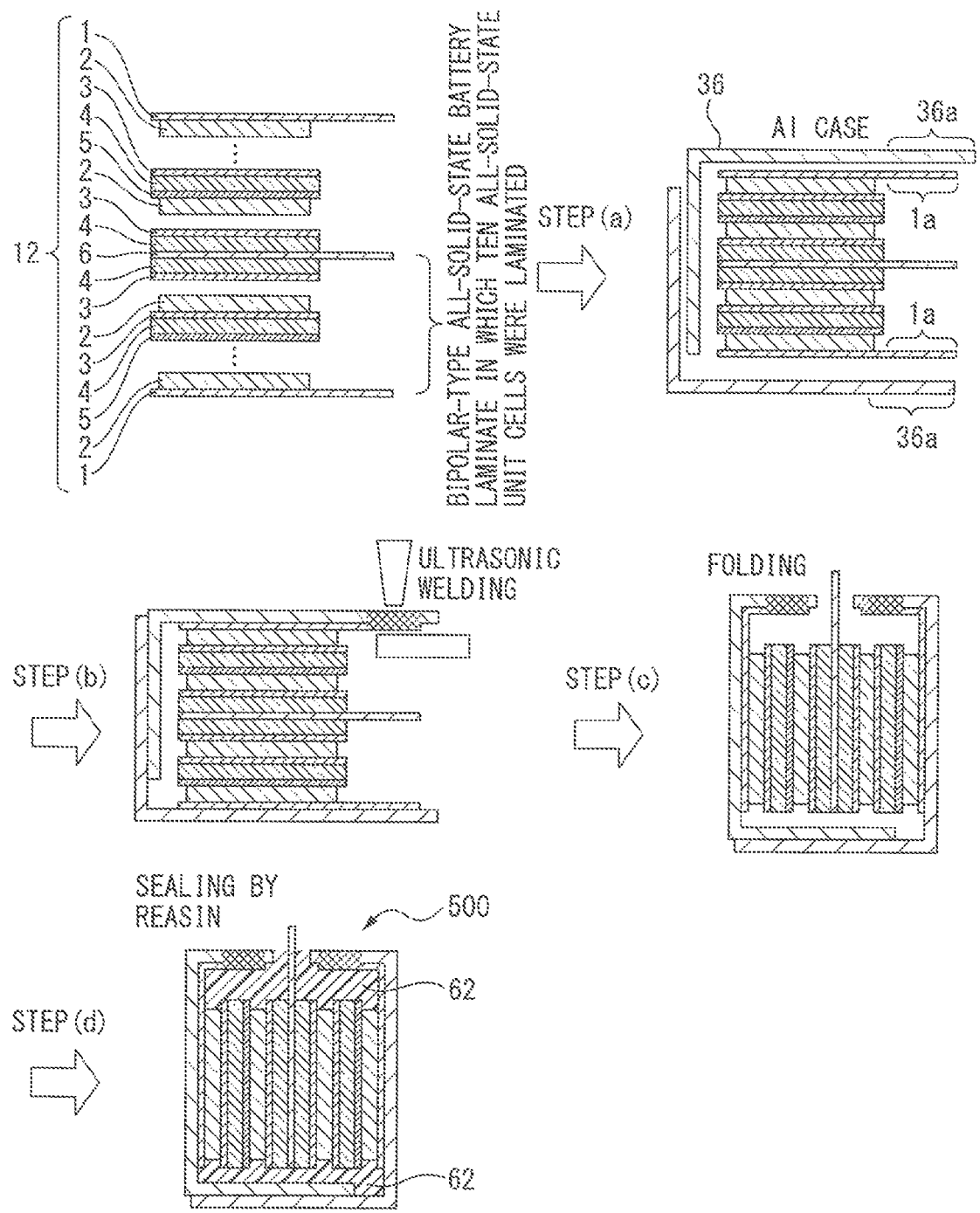
FIG. 7 is a schematic cross-sectional view of a process for producing an all-solid-state battery according to Example 1.

An all-solid-state battery 500 of the present disclosure was produced based on the production steps shown in FIG. 7.

Specifically, two pairs of bipolar all-solid-state battery laminates, in which 10 unit all-solid-state batteries were laminated, were prepared using the following members. These were laminated as a negative electrode current collector layer 6 so as to share a copper foil, thereby producing an all-solid-state battery laminate 12 in which a total of 20 unit all-solid-state batteries are laminated.

Positive Electrode Current Collector Layer 1: aluminum collector foil (thickness: 15 μm)

Positive Electrode Active Material Layer 2: positive electrode active material, sulfide solid electrolyte, conductive aid, and binder (thickness: 40 μm)

Positive Electrode Active Material: $LiNi_{1/3}Mn_{1/3}Co_{1/3}O_2$

Sulfide Solid Electrolyte: $Li_2S-P_2S_5-LiI-LiBr$

Conductive aid: vapor grown carbon fiber (VGCF)

Binder: polyvinylidene fluoride (PVdF)

Solid Electrolyte Layer 3: sulfide solid electrolyte and binder (thickness: 30 μm)

Sulfide Solid Electrolyte: $Li_2S-P_2S_5-LiI-LiBr$

Binder: styrene butadiene rubber (SBR)

Negative Electrode Active Material Layer 4: carbon material, sulfide solid electrolyte, and binder (thickness: 60 μm)

Carbon Material: carbon

Sulfide Solid Electrolyte: $Li_2S-P_2S_5-LiI-LiBr$

Binder: polyvinylidene fluoride (PVdF)

Positive Electrode/Negative Electrode Current Collector Layer: SUS collector foil (thickness: 15 μm)

The produced all-solid-state battery laminate 12 was introduced into an aluminum case (metal case) 36.

Thereafter, the protruding parts 1a of the two outermost positive electrode current collector layers 1 of the all-solid-state battery laminate 12 were welded to the folding margin parts 36a of the aluminum outer can 36, by ultrasonic welding.

Next, the folding margin parts 36a of the aluminum case 36 and the protruding parts la of the positive electrode current collector layers 1, which were welded to the folding margin parts 36a, were folded toward the inside of the aluminum case 36 together.

Finally, the all-solid-state battery laminate 12 was sealed in the aluminum case 36 by injecting the sealing resin 62 (epoxy resin) therein and curing the same to prepare the all-solid-state battery 500.

According to the production method of the present disclosure, it is not necessary to provide a clearance in the metal case for the insertion of a welding device, and in particular by folding in step (c), the volume of produced all-solid-state battery can be compactly controlled, whereby the energy density of the battery can be improved.

The invention claimed is:

1. An all-solid-state battery, comprising:
an all-solid-state battery laminate,
a metal case which houses the all-solid-state battery laminate, and
a sealing resin which seals the all-solid-state battery laminate inside the metal case,
wherein the metal case has an opening part and a folding margin part on at least one end thereof,
wherein the all-solid-state battery laminate includes one or more all-solid-state unit cells, each of the all-solid-state unit cells being obtained by laminating a positive electrode current collector layer, a positive electrode active material layer, a solid electrolyte layer, a negative electrode active material layer, and a negative electrode current collector layer in this order,
wherein a protruding part of the positive electrode current collector layer or the negative electrode current collector layer is welded to the folding margin part of the metal case,
wherein the folding margin part, and the protruding part of the positive electrode collector layer or the negative electrode current collector layer, which has been welded to the folding margin part, are folded toward the inside of the metal case together, and
wherein among the positive electrode current collector layer and the negative electrode current collector layer, a current collector layer of which the protruding part has not been welded to the metal case is electrically insulated from the metal case.

2. The all-solid-state battery according to claim 1, wherein among the positive electrode current collector layer and the negative electrode current collector layer, the protruding part of the current collector layer of which the protruding part has not been welded to the metal case is protrudes from the metal case.

3. The all-solid-state battery according to claim 1, wherein the all-solid-state battery laminate is bipolar or monopolar.

4. The all-solid-state battery according to claim 1, wherein an angle between the folding margin part and an inner wall of the metal case is an acute angle.

5. The all-solid-state battery according to claim 1, wherein the sealing resin is a thermosetting resin.

6. The all-solid-state battery according to claim 1, wherein the sealing resin is a thermoplastic resin.

* * * * *